Oct. 1, 1935.  M. EWALD  2,015,666
PEELING MACHINE AND PROCESS
Original Filed April 28, 1927  4 Sheets-Sheet 2
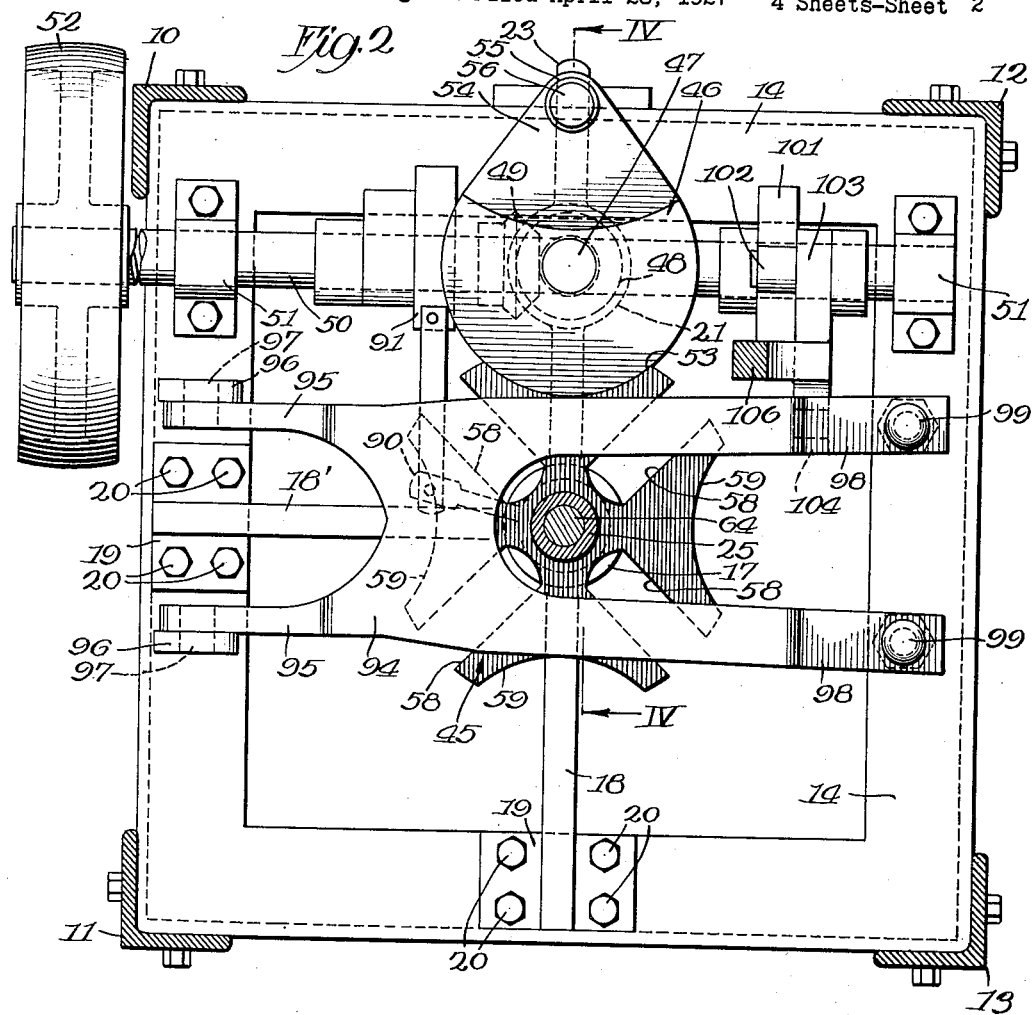
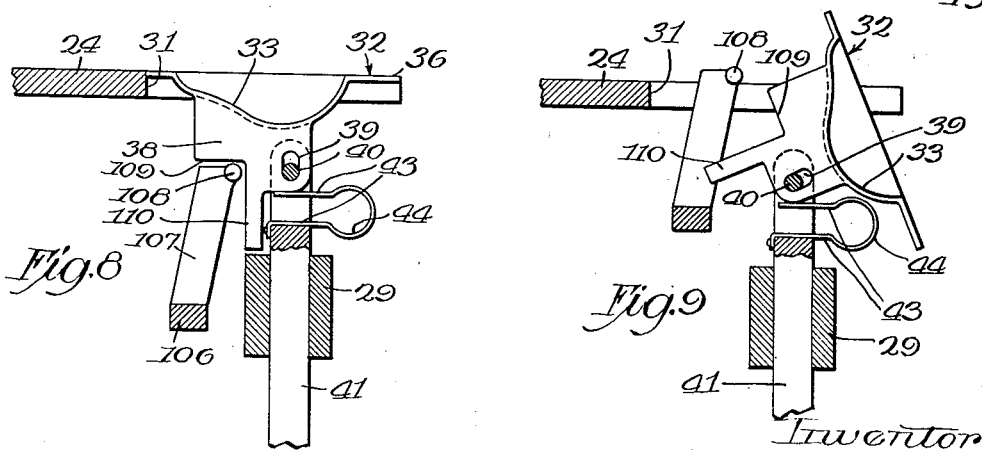
Inventor
Mark Ewald Oct. 1, 1935.  M. EWALD  2,015,666
PEELING MACHINE AND PROCESS
Original Filed April 28, 1927   4 Sheets-Sheet 3

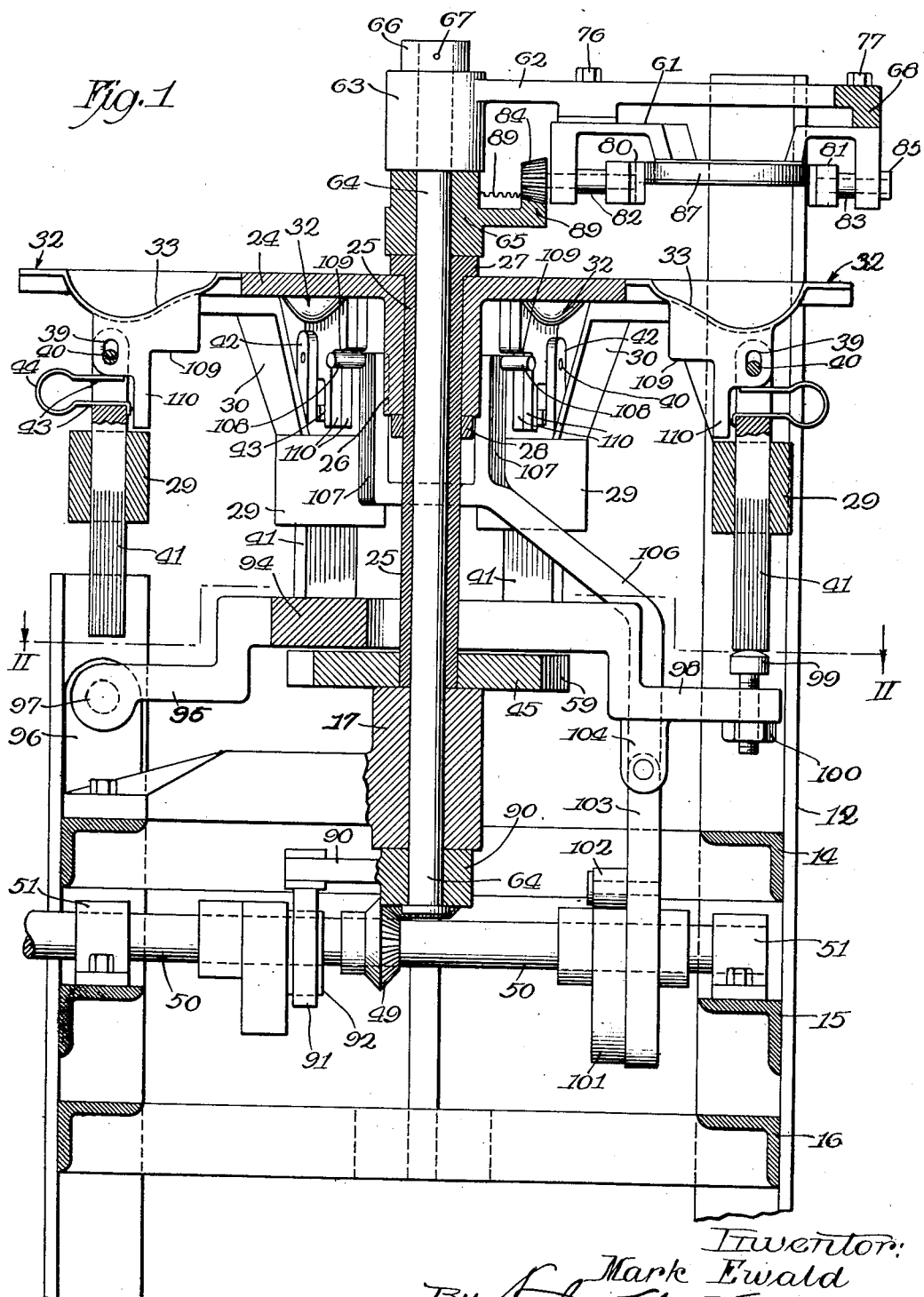

Inventor:
Mark Ewald

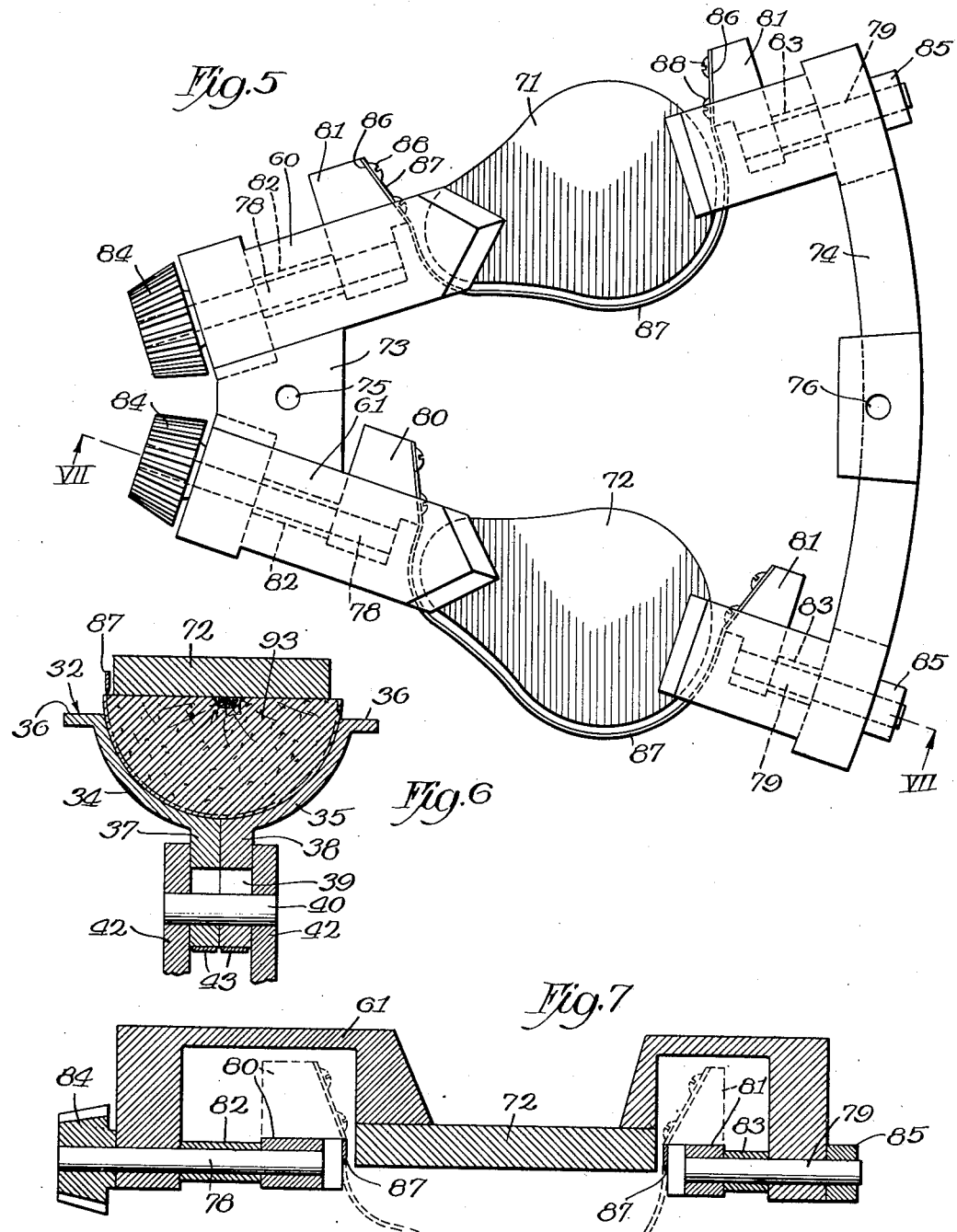

Patented Oct. 1, 1935

2,015,666

UNITED STATES PATENT OFFICE 2,015,666

PEELING MACHINE AND PROCESS

Mark Ewald, Olympia, Wash., assignor to Special Equipment Company, Portland, Oreg., a corporation of Oregon Application April 28, 1927, Serial No. 187,158
Renewed October 28, 1932

94 Claims. (Cl. 146—43)

This invention relates to peeling machines and methods and more particularly to means and process for removing the epidermis from edible articles, although it may be employed with equal advantage for other purposes.

It contemplates more especially the provision of means and process effective to remove the epidermis of edible articles and simultaneously impart a predetermined uniform shape thereto with a view of improving the appearance thereof for immediate consumption or canning.

The canning industry has grown to enormous proportions, and edible articles of every description are now capable of being preserved in suitable containers for future consumption. It has been found that the best results are obtained with peeled articles, especially fruits, in that the epidermis thereof usually is unsightly and impervious to the effects of the preserving solution.

It is customary to peel fruits and other edible articles by hand prior to the canning thereof, but this method has not proven entirely satisfactory in that it entails much labor, expense, and is not conducive to the preservation of articles of a predetermined uniform shape, this being highly desirable in that it materially improves the appearance thereof.

One object of the present invention is to simplify the construction and improve the operation of devices of the character mentioned.

Another object is the provision of means for removing the epidermis of edible articles and to simultaneously impart a uniform predetermined shape thereto.

Still another object is the provision of means for imparting a predetermined shape to edible articles by removing the epidermis therefrom.

A further object is the provision of a machine capable of receiving edible articles to effect the removal of the epidermis therefrom prior to their discharge.

A still further object is the provision of novel article sustaining means capable of co-operation with a correspondingly shaped instrument to effect the complete removal of the epidermis of an article.

Still a further object is the provision of an epidermis severing instrumentality capable of imparting a predetermined shape to an article.

Another object is the simplification and improvement of the mode of removing the peeling from fruit.

Yet another object is the provision of a method for removing the epidermis of edible articles and to simultaneously impart a uniform predetermined shape thereto.

Other objects and advantages will appear from the following description of the illustrative embodiment of the present invention.

For carrying out the process of this invention a machine such as that illustrated in the accompanying drawings may be employed, but the process is not inherent in such machine, for other devices may be employed with equal facility. Hand methods may also be employed.

In the drawings:

Figure 1 is a sectional view in elevation of a device embodying features of the present invention and in which the process of the present invention may be practiced;

Figure 2 is a sectional view taken substantially along line II—II of Figure 1;

Figure 5 is a slightly enlarged plan view of the severing instrumentalities disclosed in Figure 3;

Figure 6 is a diametric section of an article sustaining means in conjunction with a pad for sustaining an article therebetween, a side view in elevation of the sustaining means being shown in Figure 1;

Figure 7 is a sectional view taken substantially along line VII—VII in Figure 5;

Figure 8 is a side view in elevation of the article sustaining means shown in Figure 6; and Figure 9 is a view in elevation of the sustaining means shown in Figure 8, the position thereof being inclined to indicate the manner in which the articles are discharged therefrom.

Like reference characters are used to designate similar parts in the drawings and in the description of the device illustrated which follows.

The structure selected for illustration comprises a frame of any suitable construction, in this instance consisting of vertically disposed angle irons 10, 11, 12, and 13 constituting corner sections which are maintained in fixed spaced relation by virtue of a series of horizontally disposed rectangular plates 14, 15 and 16 fixed to the corner members in superposed relation (Figure 1).

Figure 4:
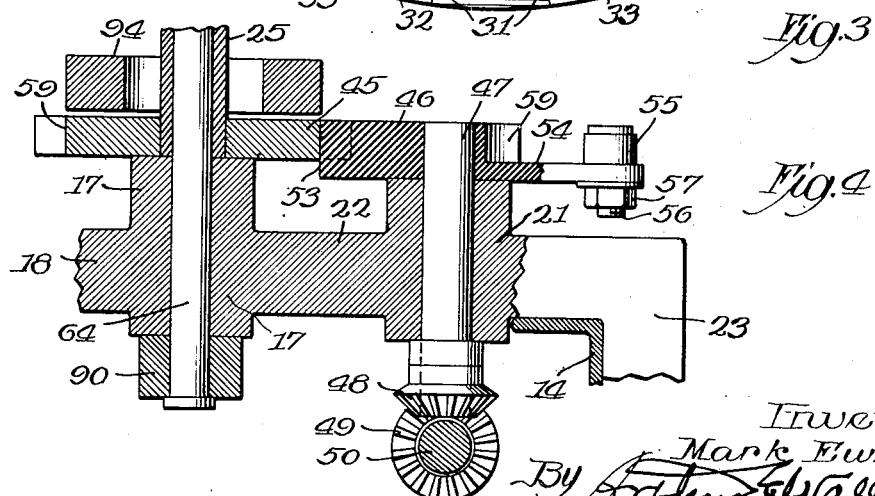
Figure 4 is a sectional view taken substantially along line IV—IV of Figure 2.

A vertically disposed bearing 17 is sustained by the plate 14 owing to its radially extending integral arms 18 and 18' which terminate in brackets 19 fixed to the plate 14 in any suitable manner such as by the fasteners 20 of standard construction. Another vertically disposed bearing 21 (Figure 4) is spaced from and formed integral with the bearing 17 through the medium of an interconnecting member 22. The bearing 21 terminates in an angular extension 23 formed integral therewith to rest upon the plate 14 to create a three point suspension (arms 18, 18', and 23) of the spaced vertically disposed bearings 17 and 21 as will appear from the showing in Figure 2.

A horizontally disposed table 24 of substantially circular configuration is fixed to a tubular sleeve 25 which rests upon the bearing 17 in axial alignment therewith so that the bores thereof will be in communicating relation, the table 24 having an axially extending hub 26 which impinges against a peripheral shoulder 27 provided at the extremity of the tubular sleeve 25. Any suitable supporting means may be employed to retain the table 24 in its desired vertical position, this being accomplished in this instance by a collar 28 detachably fixed to the tubular sleeve 25 to support the axial hub 26 of the table 24, thereby effecting movement of the table 24 in unison with the tubular sleeve 25.

A series of circumferentially spaced bearings 29 are disposed beneath the table 24, they being suspended therefrom by means of the brackets 30 formed integral therewith for attachment to the table in any suitable manner. The face of the table is provided with a series of openings 31 of irregular shape spaced about the periphery thereof, in this instance in closely associated pairs disposed on normally related axes of the circular table 24 to define eight openings therein in vertical axial alignment with the bores of the bearings 29 supra. Each of the openings 31 is provided with a corresponding shaped article sustaining member 32 having a concavity 33 therein of any desired configuration which, in this instance, simulates the shape or contour of a pear, it being obvious that other shapes may be employed to accommodate different articles therein.

The article sustaining members 32 preferably of segmental construction consist of complemental sections 34 and 35, which terminate in a continuous peripheral flange 36 having a shape corresponding to the opening 31 provided in the surface of the table 24 for their disposition therein. Each of the segments 34 and 35 have downwardly extending contacting shanks 37 and 38, respectively, disposed adjacent each other for relative slidable movement. The adjacent contacting shanks 37 and 38 are provided with normally aligned elongated apertures 39 which receive a pin 40 therethrough to render the segments movable with respect to a support 41 which is forked at the end thereof to define spaced confronting furcations 42, the support 41 being reciprocal in the bearings 29. The contacting shanks 37 and 38 are confined intermediate the furcations 42 by virtue of the pin 40 which bridges the furcations 42 to sustain the segments 34 and 35, in this instance constituting the article sustaining member 32, in position.

As shown, the segments 34 and 35 are normally maintained in complemental relation by virtue of individual yieldable springs, in this instance comprising a flat metallic member shaped to define confronting portions 43 interconnected by a substantially circular portion 44 effective to repel the confronting portions 43 to normally urge the segments 34 and 35 upwardly to sustain an article therein. It is to be noted that individual springs 43 are employed to impinge against each of the shanks 37 and 38, so that the respective segments 34 and 35 may be moved relative to each other against the action of the spring supporting means 43 for reasons which will appear more fully hereinafter.

Intermittent motion is imparted to the table 24 by virtue of a Geneva cam 45 fixed to the tubular shaft 25 at the lower extremity thereof in contacting relation with the vertically extending bearing 17 to cooperate with a cam 46 fixed to a stud shaft 47 journalled in the bearing 21. The stud shaft 47 is driven by a bevel gear 48 fixed to an extremity thereof for meshing engagement with a correspondingly shaped bevel gear 49 fixed to a driving shaft 50 journalled in split bearings 51 fixed to the plate 15 supra. A pulley 52 is fixed to an extremity of the shaft 50 to enable any suitable power means to be harnessed thereto to effect rotation of the shaft 47 carrying the cam 46 thereon. The cam 46 is composed of a substantially circular portion 53 constituting a substantial portion of the circle which terminates in a reduced extension 54 having a face thereof disposed beneath the plane of the Geneva cam 45.

The reduced portion 54 has a roller 55 journalled on a pin 56 detachably fixed to the extremity of the portion 54 by virtue of a nut 57, the roller 55 being disposed in the plane of the Geneva cam 45 for periodic coaction with the normally disposed slots 58 provided therein to correspond with the spacing of each pair of article sustaining members 32 supra. Intermediate the normally disposed slots 58, in this instance four, are arcuate surfaces 59 which coact with the circular portion 53 of the cam 46 to maintain the Geneva cam 45 against rotation during the interval defined by the circumferential extent of the circular segment on the cam 46. The table 24 will be moved a quarter of a revolution each time the roller 55 is projected within a slot 58, it being held against movement upon engagement of the circular portion 53 with the arcuate surface 59 of the Geneva cam 45, thereby imparting intermittent predetermined movement of the table 24.

Edible articles such as fruit, in this instance pears, are first sliced in half for disposition in the concavities 33 of the sustaining members 32, the concavities being formed to correspond with the exterior shape of the article placed therein. To remove the epidermis from the articles placed in the sustaining members 32, it is first desirable to maintain the articles therein against movement. In the present embodiment, a pair of interconnected angularly related, radially extending brackets 60 and 61 are suspended from a radially extending support 62 which terminates in a bearing 63 having a vertical bore at one extremity thereof to receive an axially extending shaft 64 journalled in the tubular sleeve 25, supra.

Figure 3:
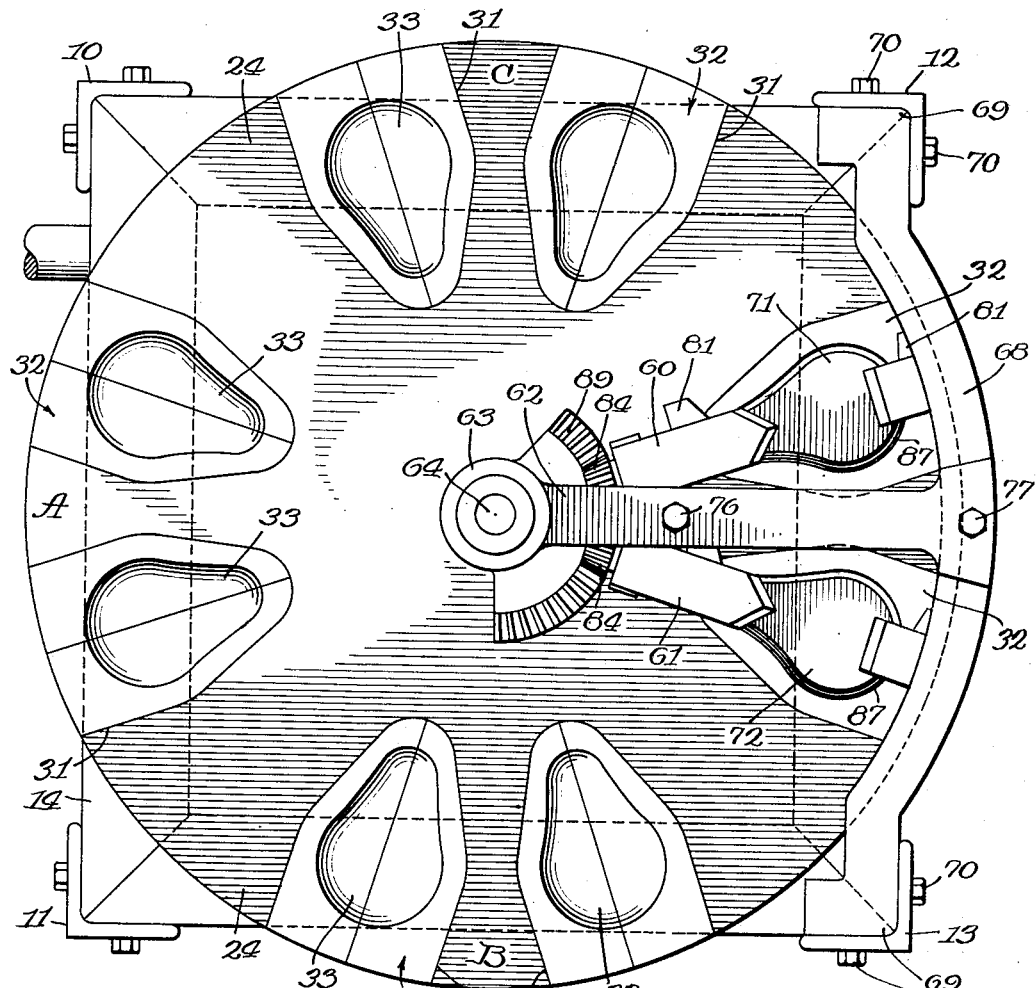
Figure 3 is a sectional view taken substantially along line III—III of Figure 1.

As shown, the shaft 64 projects entirely through the bearing 63 which rests upon a spacer bearing 65 introduced between the bearing 63 and the shoulder 27 of the tubular shaft 25. The extremity of the shaft 64 is provided with a collar 66 detachably fixed thereto by virtue of a set screw 67 of standard construction. The other extremity of the support 62 is integrally associated with an arcuate extension 68 intermediate the ends thereof, the extension 68 having angularly related extremities 69 to co-operate with the interior of the angle iron supports 12 and 13 (Figure 3) which serve as a support therefor owing to the fasteners 70 detachably associated therewith.

It is to be noted that the brackets 60 and 61 are so related as to correspond with the spacing of each pair of article sustaining members 32, there being provided substantially flat pads 71 and 72 (Figures 1, 3, 6, and 7) on the underside of the brackets intermediate the ends thereof in superposed alignment with the concavities 33 of the article sustaining members 32 when positioned in registry therewith. The pads 71 and 72 are shaped to correspond with the peripheral edge of the concavities 33, they being slightly smaller in size with respect thereto to permit the epidermis severing means to travel therearound. It is to be noted that the brackets 60 and 61 are maintained in spaced relation by arcuate spacing elements 73 and 74 fixed thereto near the extremities thereof (Figure 5) with apertures 75 therein to enable the securing thereof to the supporting bar 62 by means of fasteners 76 and 77.

Axially aligned stud shafts 78 and 79 are journalled in each of the brackets 60 and 61, to receive mounting means 80 and 81 on the confronting extremities thereof, the mounting means being maintained in spaced relation with respect to the brackets 60 and 61 by virtue of tubular spacer elements 82 and 83. The free extremity of the shafts 78 are provided with bevel gears 84 which constitute a means for imparting rotary motion to the mounting means 80 and 81 as will appear hereinafter. The free extremity of the stud shaft 79 is provided with a collar 85 to prevent axial movement of the shaft 79 within its bearing.

The mounting means 80 and 81 are provided with inclined diverging surfaces 86 to receive thereon a substantially flat metallic ribbon 87 secured thereto by means of the fasteners 88 of any suitable construction. The strap 87 is bent intermediate the ends thereof to assume a shape corresponding with the interior contour of the concavities 33 whereby the ribbon 87 constitutes a cutter to sever the epidermis of the articles sustained within the concavities 33 of the members 32, the edges of the ribbon 87 being ground or otherwise shaped to enable the severance of the epidermis from an article. The pads 71 and 72 are so spaced as to bring a pair of article sustaining members 32 in registry therewith responsive to the intermittent motion imparted to the table 24 by the mechanism described above.

The epidermis severing means, constituting in this instance two metallic ribbons 87 mounted on each of the brackets 60 and 61, are oscillated in timed relation with the movement of the table 24 so as to coact with the interior of the concavities 33 of the article sustaining members 32 during the period of rest of the table 24. At this time the sustaining members are in registry with the pads 71 and 72. The pads 71 and 72 serve to maintain the fruit or other articles contained in the sustaining members, against movement in that the latter are elevated to cause the fruit to contact with the pads 71 and 72 (Figure 6) prior to the operation of the severing means 87. Movement is imparted to the severing means by virtue of the bevel gears 84 fixed to the stud shafts 78 journalled in each of the brackets 60 and 61, the gears 84 being in mesh with a mutilated gear 89 integrally or otherwise associated with the spacer bearing 65 which is fixed to the shaft 64, supra.

The shaft 64 extends downwardly and terminates in a crank arm 90 fixed to the extremity thereof. The crank arm 90 has a cam follower 91 fixed thereto to co-act with a cam 92 fixed to the shaft 50 to impart oscillatory movement to the shaft 64 in proper timed relation with respect to the intermittent movement of the table 24 so as to actuate the epidermis severing means 87 at the proper time, this being the rest period of the table 24 which, as described above, is intermittently rotated.

Just prior to the actuation of the epidermis severing means 87, a pair of article sustaining members in the vicinity of the pads 71 and 72 are raised to co-act therewith in the manner disclosed in Figures 1 and 6, so as to hold the fruit or other articles 93 clamped between the sustaining concavities 33 and their respective pads 71 and 72. This is accomplished in this instance by virtue of the lever 94 which has furcations 95 at one extremity thereof co-operating with the upstanding lugs 96 fixed to the rectangular plate 14 supported by the corner members 11, 11, 12, and 13, supra. A pin 97 projects through aligned apertures in the furcations and lugs 95 and 96, respectively, to enable pivotal movement of the lever 94, so that the other furcated extremities 98 thereof will co-act with the guide rods 41 of each of the sustaining members 32 disposed in registry with the pads 71 and 72. The furcated extremities 98 are preferably provided with stops 99 adjustably fixed to the furcations 98 by virtue of threaded nuts 100 so that the guide rods 41 will normally contact with the stops 99 just prior to the upward movement imparted to the lever 94 responsive to the movement of the shaft 50. For this purpose the shaft 50 is provided with a cam 101 thereon to co-act with the cam follower 102 fixed to a rod 103 which is pivoted to a lug 104 constituting a part of the furcated lever 94. As shown, the cam 101 is of such shape as to vertically reciprocate the guide rods 41 of the sustaining members 32 in registry with the pads 71 and 72 to clamp the articles therebetween at that particular time.

It is important to note that simultaneous with the operation of the epidermis severing means 87, its mounting means 80 and 81 coact with the peripheral flange 36 of the sustaining members 32. The segments thereof will thus be individually depressed during the movement of the severing means therein to enable the epidermis to be removed from that portion of the article while the other segment or segments sustain the first in its desired position, so that the knife, or severing instrumentality in passing from one segment to the other will depress the approaching segment simultaneously with the rise of the formerly depressed segment due to the urge of the spring 43. Thus the complementary segment will be depressed while the other has risen to permit the knife to move therein without obstruction thereto, the article being continuously sustained against the pads.

Subsequent to the removal of the epidermis from each half of the articles sustained in the concavities 33 disposed in registry with the pads 71 and 72, the peeled fruit is moved to the next station where a lever 106 which is operatively connected to the lever 94, imparts pivotal movement to the sustaining members 32 having the peeled fruit confined therein. This is accomplished by furcations 107 on the lever 106, which are provided with normally disposed pins 108 thereon capable of engagement with a shoulder 109 formed on the shanks 37 and 38 of the article sustaining members 32. As shown, the shanks 37 and 38 of the complementary segments constituting the sustaining members 32, terminate in downwardly extending lugs 110 disposed adjacent the shoulder 109 so that the pins 108 will ride thereover in their downward movement to assist the spring 43 in returning the sustaining members 32 to their normal position to receive other articles therein to be peeled in a manner described hereinabove.

With the arrangement of parts above described, the fruit or other articles are first sliced in half, and each portion thereof is placed in the concavities 33 of the sustaining members 32 at station A or B, or both (Figure 3), whereupon the sustaining members at station B will be intermittently moved in registry with the pads 71 and 72. At this position the cam 101 on the shaft 50 will lift the lever 94 to effect the rise of the guide members 41 to which the sustaining members are operatively connected for effecting the engagement of the articles with the pads 71 and 72.

The knives or epidermis severing means 87 will thereupon be actuated to swing within the concavities 33 so that the segments thereof will be individually depressed simultaneously with the removal of the epidermis from the article, the complementary segments being effective to sustain the article in spaced relation to the depressed segments. The sustaining members containing the peeled articles are then moved to the next station C, at which point the lever 106 moves upwardly to effect the inclination of the sustaining members (Figure 9) from which the articles are discharged into a suitable container (not shown). Thus it will be apparent that means have been provided to remove the epidermis from articles and simultaneously impart a predetermined uniform shape thereto depending upon the contour of the severing ribbon 87. The paring process is conducted while the fruit is held upon its plane surface.

Obviously, articles of any configuration or shape may be peeled by merely changing the contour of the sustaining members 32 and effecting a corresponding change in the severing means, this being possible by merely detaching the severing instrumentality 87 from the mounting members 80 and 81. Should it be necessary to change the space therebetween, another spacing sleeve 82 or 83 of different length may be substituted, thereby enabling the desired adjustability. Further, the entire structure composed of the angularly disposed brackets 60 and 61 (Figure 5) may be removed as a unit should it be desired to substitute another unit therefor. As shown, the sustaining members 32 are also readily removed to enable the substitution of members of various configuration therefor in the event other articles of different shapes are to be peeled.

Various changes may be made in the embodiment of the invention herein specifically described without departing from or sacrificing any of the advantages of the invention described in the appended claims.

Likewise, many changes may be made in the mechanical device herein described for the preparation of a fruit for canning without departing from the spirit of the invention of the process. It is therefore intended that the invention as it concerns the process shall be limited in its scope only coextensively with the appended process claims.

I claim:

1. The combination with successive article sustaining means of predetermined shape, of severing means correspondingly shaped to coact with the interior of said sustaining means, means for actuating said severing means in periodic timed relation with successive sustaining means, and means for dumping the sustaining means subsequent to the coaction of said severing means therewith.

2. The combination with a frame, of a table rotatively mounted thereon, article sustaining means carried by said table, epidermis severing means mounted to cooperate with said sustaining means, means for imparting intermittent motion to said table to bring successive sustaining means in registry with said severing means, and means for imparting movement to said severing means in timed relation with said article sustaining registry means.

3. The combination with a frame, of a table rotatively mounted thereon, article sustaining means carried by said table, epidermis severing means mounted to cooperate with said sustaining means, means for imparting intermittent motion to said table to bring successive sustaining means into registry with said severing means, means for imparting movement to said severing means in timed relation with said article sustaining registry means, and means for effecting the removal of the articles from said sustaining means subsequent to the operation of said epidermis severing means.

4. Fruit trimming apparatus comprising in a tray having a recess therein to support a one-half section of fruit, and a knife mounted to swing within said recess in close proximity and from end to end to the inner surface thereof.

5. Fruit treating apparatus comprising fruit sustaining means, epidermis severing means having a configuration corresponding to the periphery of a side of fruit to be treated therein, and means for effecting a coaction of said severing means and said sustaining means to pare the skin from such fruit.

6. The combination with successive article sustaining means, of epidermis severing means having a configuration corresponding to the periphery of a side of an article to be sustained in said sustaining means, and means for periodically actuating said epidermis severing means in timed relation with successive article sustaining means.

7. The combination with a plurality of article sustaining means, of epidermis severing means, means for periodically actuating said epidermis severing means in timed relation with successive article sustaining means, and means for effecting removal of the articles contained in said sustaining means subsequent to the removal of the epidermis therefrom.

8. The combination with a plurality of successive article sustaining means of predetermined shape, of severing means correspondingly shaped to coact with the interior of said sustaining means, and means for actuating said severing means in periodic timed relation with successive sustaining means.

9. Fruit treating apparatus comprising successive article sustaining means of predetermined shape, severing means correspondingly shaped to coact with the interior of said sustaining means, means for actuating said severing means in periodic timed relation with successive sustaining means, and means for effecting the discharge of said sustaining means subsequent to the coaction of the severing means therewith.

10. In combination, a segmental sustaining means to receive a correspondingly shaped article, yieldable means for normally maintaining said segments in complemental relation, and article epidermis severing means mounted for coaction with the interior surface of said sustaining means, said segmental sustaining means being adapted to move relatively to one another coincidentally with the movement of said epidermis severing means through an article in said sustaining means.

11. The combination with a segmental article sustaining member, of means for normally maintaining said segments in complemental relation, and an epidermis severing means mounted to coact with the interior surface of said sustaining member and adapted to cause said segments to move relatively to one another coincidentally with the removal of the epidermis from an article in said sustaining means.

12. The combination with an article sustaining member having a concavity corresponding in shape to an article receivable therein, of an epidermis severing strap shaped to correspond with said concavity, and means fixed to the extremities of said strap to effect the rotation thereof in coacting relation with said concavity.

13. A fruit sustaining member having a concavity corresponding in shape with a fruit receivable therein and comprising complemental segments, an epidermis severing strap shaped to correspond with said concavity, means fixed to the extremities of said strap to effect the rotation thereof in coacting relation with said concavity, and means for yieldingly maintaining said segments in complemental relation.

14. The combination with an article sustaining member comprising segments movably and complementally disposed to one another to form a concavity corresponding in shape with an article receivable therein, of an epidermis severing strap shaped to correspond with said concavity, means fixed to the extremities of said strap to effect the rotation thereof in coacting relation with said concavity, and means for yieldably maintaining said segments in said complemental relation, said segments being moved relatively to one another responsive to the rotation of said epidermis severing strap through an article engaged thereby.

15. An article sustaining member having a concavity corresponding in shape with the article receivable therein and comprising complemental segments, an epidermis severing strap shaped to correspond with said concavity, means fixed to the extremities of said strap to effect the rotation thereof in coacting relation with said concavity, and means for yieldably maintaining said segments in complemental relation, said segments being adapted to be moved relatively to one another responsive to the passage of said strap through an article in said sustaining member.

16. The combination with a frame, of a plurality of article sustaining means carried thereby, a member on said frame in superposed relation with said sustaining means, means for intermittently moving said sustaining means, means for intermittently registering said sustaining means and said superposed member to maintain an article therebetween, and epidermis severing means mounted for coaction with the interior of said sustaining means and rotatable in timed relation with the registry of an article sustaining means with said superposed member.

17. The combination with a frame, of a plurality of article sustaining means carried thereby, a member on said frame in superposed relation with said sustaining means, means for intermittently registering said sustaining means with said superposed member to maintain an article therebetween, epidermis severing means mounted to coact with the interior of said sustaining means and rotatable in timed relation with the registry of an article sustaining means and said superposed member, and means for effecting the discharge of the contents of said sustaining means subsequent to the coaction of the severing means therewith.

18. The combination of means for sustaining an article in a predetermined position, severing means conforming in contour with said sustaining means and extending from end to end thereof, and means for actuating said severing means to remove the epidermis from the article in said sustaining means.

19. The combination with relatively movable members capable of supporting an article therebetween, of severing means of predetermined shape associated therewith and extending from end to end of said supporting members, and means for effecting relative movement between said severing means and said supporting members to remove the epidermis from the article and to simultaneously impart the shape of said severing means thereto.

20. The combination with an article sustaining member, of a metallic strip of a predetermined shape corresponding to the configuration of the periphery of one side of an article to be sustained in said sustaining member and mounted for movement relative to said sustaining member, and means for effecting movement of said strip to remove the epidermis from such article and to thereby impart a shape thereto corresponding with said strip.

21. Fruit trimming apparatus comprising a holding member having a recess therein to receive a one-half section of fruit, and a knife mounted to swing through said recess in close proximity to and from end to end of the inner surface thereof.

22. Fruit trimming apparatus comprising a holding member having a recess therein to receive a one-half section of fruit, and a curved knife having a shape corresponding substantially with the periphery of a fruit in said pocket member and mounted to swing within said recess in spaced relation to the side walls thereof and from one side of said recess to the other.

23. Fruit trimming apparatus comprising a base, a fruit holding member having a recess formed therein to receive a half-section of fruit, a shaft rotatably mounted upon said base, and a trimming knife secured to said shaft to sweep in proximity to the inner surface of said recess to remove the skin of a fruit in said holding member.

24. Fruit trimming apparatus comprising a fruit holding member formed with a recess having the configuration of a half-section of a fruit, a shaft rotatably mounted in parallel with the longitudinal axis of said recess, and a curved trimming knife secured at its opposite ends to said shaft and arranged to sweep within said holding member in predetermined spaced relation to the inner surface of the recess therein to remove the skin of a fruit in said holding member.

25. Fruit trimming apparatus comprising a holding member having a recess therein to receive a half-section of a fruit, and a trimming knife rotatably mounted to swing within said recess and remove, at one rotation, the skin from a half fruit in said holding member.

26. Fruit trimming apparatus comprising a holding member having a pocket to receive a one-half section of fruit, and a knife having a shape corresponding substantially with the periphery of a fruit in said pocket member and mounted to sweep within said pocket at a predetermined distance from the inner surface thereof.

27. In a fruit treating apparatus, a turret, a fruit receptacle on said turret, a rotatable blade corresponding to the outer periphery of a fruit to be treated and extending from end to end thereof for severing a section from said fruit, means periodically changing the distance between said receptacle and blade in a direction parallel to the axis of said turret, and means for rotating said blade about an axis normal to the axis of said turret when said blade and said receptacle are in close proximity.

28. In a fruit treating device, a fruit pocket comprising a frame, complemental segments in said frame and adapted to slidingly move relatively to one another along a plane traversing said pocket thereby distorting the shape of said pocket from normalcy, and means for urging said segments into a predetermined complemental relation to effect the normal shape of said pocket.

29. In a fruit treating device, a cup comprising slidably abutting segments, the contour of the pocket in said cup being changed incident to a sliding of said segments, a frame for said cup, and supporting means intermediate said frame and segments admitting of sliding movement between said segments and said frame.

30. In combination, a receptacle having a recess to receive a half fruit, a holding member engaging such half fruit upon its severed surface to maintain it against displacement from said recess, a knife coextensive with said recess, and means for moving said knife into and across said recess in a selected spaced relation to the interior surface thereof.

31. In combination, a receptacle having a recess therein to receive a fruit, a holding member engaging such fruit to maintain it in said receptacle and with the epidermis of such fruit against the walls of said recess, a knife having a cutting edge extending across said recess and having a body projecting beyond the ends of said holding member, and means for moving the cutting edge of said knife into and across its recess through the fruit in proximity to said epidermis.

32. A fruit paring apparatus comprising a receptacle for fruit, a holding member having a curved wall for holding a fruit in said receptacle, and a cutting blade extending around said holding member and movable within and across said receptacle through a course in close proximity to and in parallelism to said wall.

33. A fruit paring apparatus comprising a receiving cup, a plate to engage and maintain fruit in said cup while being peeled, a knife rotatable into said cup about an axis substantially within the plane of said plate and having cutting edges extending beyond the edge of said plate, and means for rotating said knife.

34. A fruit paring apparatus comprising a cup to receive fruit, a member having a surface for engaging a fruit to maintain it in said cup, and a knife rotatable on an axis more removed from said cup than the fruit-engaging surface of said member and sweeping into and out of said cup beyond the diametrically opposed edges of the fruit-engaging surface of said member.

35. A fruit paring apparatus comprising a cup to receive a half fruit, a member having a surface to engage the flat face of such fruit, a rotatable knife having a mid-section curved about the edges of said member and pivoted at its ends, and means for rotating said knife from one edge of the member to the opposite edge thereof and about an axis arranged in parallelism with said surface.

36. Pear trimming apparatus comprising a tray having a recess therein to support the external periphery of a half section of such a fruit, and a knife having a shape corresponding to the external periphery of a pear mounted to swing within said recess from edge to edge in spaced relation to the inner surface of said recess.

37. Fruit trimming apparatus comprising a tray having a recess therein of the shape of a half section of a pear and to support such a half section of a fruit, and a knife having a shape corresponding to the shape of said recess and mounted to swing within said recess in spaced relation to the inner surface thereof, to impart to the fruit the shape of said knife.

38. In a fruit treating device, a fruit sustaining member comprising segments of a shape of a section of such fruit, means for mounting said segments for movement relatively to one another, and an epidermis severing blade conforming in shape to the interior of said fruit sustaining member and with the periphery of such section of fruit, said blade being mounted for travel through said article sustaining member in close proximity to the inner surface of said segments and said segments being movable coincidentally with the movement of said blade as it separates the epidermis from the body of a fruit in said article sustaining member.

39. A fruit paring device comprising a sectional cup to receive a half fruit, a member engaging the flat face of such half fruit in said cup, a knife having a shape corresponding to the outer periphery of such fruit and operable in a path between said cup and said member, and means resiliently maintaining said sectional cup in a predetermined shape and admitting of the distortion thereof coincidental to the entry of said knife into a fruit held between said cup and said member.

40. In combination, a segmental sustaining means to receive a correspondingly shaped article, yieldable means for normally maintaining said segments in complemental relation, and article epidermis severing means mounted for coaction with the interior surface of said sustaining means, said segmental sustaining means being adapted to move relatively to one another coincidentally with the movement of said epidermis severing means through portions of an article in said sustaining means.

41. The combination with a frame, of a plurality of article sustaining means carried thereby and moving in a horizontal plane, a member on said frame in superposed relation with said sustaining means, means for intermittently moving said sustaining means, means for intermittently registering said sustaining means and said superposed member to maintain an article therebetween, and epidermis fruit trimming means mounted for coaction with the interior of said sustaining means shaped to correspond with the internal periphery of said sustaining means and rotatable in timed relation with the registry of an article sustaining means with said superposed member.

42. The combination with relatively movable members complementally disposed for supporting a half pear therebetween, one of said members supporting the periphery of the fruit and the other the flat surface thereof, of a fruit shaping knife having a cutting edge extending from end to end of said complementally disposed members and axially of such half fruit, said knife being shaped to correspond with the shape of such fruit, and means for rotating said knife in a fixed path when said complementally disposed members are in proximity.

43. The combination of opposed holding members for enclosing a half fruit, one of said holding members comprising relatively movable sections engaging the periphery of the fruit, a paring knife mounted for movement substantially one hundred and eighty degrees in a predetermined semi-circular arc in close proximity at all times to the interior of said peripheral sections, and support means for said peripheral sections admitting of their displacement relatively to one another coincident to the insertion of said knife into a half fruit positioned between said holding members to separate the peel from the body of the fruit without changing the relative position of the peel and fruit body.

44. In combination, support means for a half fruit comprising holding members, one of said members engaging the flat surface of the half fruit and the other the periphery thereof, means for compressing said flat surface engaging member upon such half fruit, and a knife of the shape of the periphery of the fruit and insertable between said members, said compressing means being resilient and the urge thereof upon the fruit being insufficient to prevent relative movement between said holding members as said knife travels through a half fruit held thereby.

45. In combination, complemental holding means for maintaining a half fruit therebetween, one of said means corresponding in shape to the curved surface of the fruit, a peeling knife coextensive with the peripheral section of such fruit and insertable between said maintaining means, and means for supporting said knife, said knife moving from one edge to the other edge of the flat face of such fruit in a fixed path parallel to and in close proximity to said curved holding means.

46. In combination, a series of sustaining means for individual half fruits, yielding supporting means for said sustaining means to compensate for different sizes of fruit, a knife corresponding in shape to the type of fruit being trimmed coacting with the interior of said sustaining means for paring the peel from a half fruit therein, means causing registration of said knife with successive sustaining means, and means for actuating said knife during such registration.

47. Fruit treating apparatus comprising a series of receptacles each having a recess for receiving a fruit section, a knife of the shape of the internal periphery of and substantially coextensive with the end to end dimensions of such recesses, knife supporting means for guiding said knife into and out of said receptacles at a selected spaced relation from the walls of the recess, means causing registration of said knife and successive receptacles, and means for imparting movement to said knife during such registration.

48. Fruit treating apparatus comprising a series of receptacles each having a recess for receiving a fruit section and conforming substantially with the curved periphery of such fruit, a knife having a contour corresponding to the contour of the interior of such recesses, knife supporting means for guiding said knife into such recesses at a selected distance from the wall of the receptacles, means causing successive registration of said receptacles and knife, and means for actuating said knife during such registration.

49. Fruit treating apparatus comprising a series of fruit section receiving receptacles each having a recess of a shape corresponding to a section on the selected fruit, a knife having a shape corresponding to the internal periphery of said recesses and coextensive with the end to end dimension thereof, means causing successive registration of said receptacles and knife, knife holding means for guiding said knife into such recesses at a selected distance from the walls thereof and about an axis diametric thereof, and means for actuating said knife during such registration.

50. In combination, a holder for the periphery of a half fruit, a second holder engaging the flat face of the fruit away from its periphery, and means movable in an arc substantially paralleling the inner face of said peripheral holding member for separating the peel from such half fruit in said holder, said second holder maintaining the fruit and separated peel in the first of said holders and in their normal relative position during and after the peeling operation.

51. Fruit treating apparatus comprising a series of conveyors each containing a fruit section, a fruit holding member for engaging the flat surface of such fruit sections when said conveyors are in registry therewith, means causing registration of said conveyors in seriatim with said holding member, paring means shaped to correspond with such fruit for penetration into the fruit adjacent the edges of the flat section thereof and for movement about its periphery when registered with said holding member, and means for actuating said cutting means.

52. Fruit treating apparatus comprising a receptacle for a section of fruit, and corresponding in shape to such type of fruit, holding means having a flat face substantially coextensive with the flat face of such fruit section, a knife shaped to correspond with and rotatable through the body of such fruit on an axis extending diametrically of the face thereof, means causing engagement between the holding means and the fruit, and means for actuating the knife during such engagement.

53. Fruit treating apparatus comprising a series of fruit receptacles each holding an individual section of fruit and corresponding in shape to such type of fruit, fruit holding means for engaging the flat surface of each of such sections, paring means shaped to correspond with such fruit and having pivotal end mountings spaced apart a distance greater than the length of said holding means and movable about the edges thereof, means for moving said conveyor members in seriatim into registry with said holding means, and means for actuating said paring means during such registry.

54. Apparatus having stations for the treatment of fruit and comprising fruit peeling mechanism at one of said stations, fruit discharging mechanism at another of said stations, a plurality of receptacles for half fruit, means for moving said receptacles successively to and from said stations, means for actuating said peeling mechanism, and means for actuating said fruit discharging mechanism, the actuation of each of said actuating means being synchronized with the movements of said receptacles.

55. Pear treating apparatus comprising peeling mechanism for fruit, fruit discharge means spaced from said peeling mechanism, a plurality of receptacles for half fruit, means for moving said receptacles successively into registry with said peeling mechanism and with said discharge means, and means actuating said peeling mechanism and discharge means when said cups are in registry therewith.

56. A fruit paring device comprising a cup having walls forming an open mouth therefor, a fruit holding member to close the mouth of said cup and having a fruit engaging face of an area less than the area of the open mouth of said cup, and a curved rotatable knife pivoted at its ends and movable into and out of said cup between the opposite edges of said holding member and the contiguous walls of said cup.

57. In combination, a receptacle having a recess to receive a half fruit with its flat face exposed, a holding member cooperating with said receptacle and pressing against such flat face to maintain the fruit therein, and a paring knife coextensive with said recess and mounted to swing into said recess through the meat of such fruit in proximity to the epidermis thereof.

58. In a peeling machine, a strap knife having a body possessing from end to end a predetermined curved fixed cutting edge corresponding generally to the periphery of a selected fruit, and a pivotal mounting at each end of said knife for maintaining said knife in a fixed path about such fruit.

59. In a peeling machine, a preshaped strap knife movable about the axis of a fruit and having a fixed cutting edge coextensive with such fruit and of a shape corresponding generally with the end to end contour of such fruit, and a mounting at each end of said knife for maintaining said knife in a fixed path about such fruit.

60. In a peeling machine, a rotatable preshaped strap knife having end portions and a central portion, the central portion of the knife having a fixed cutting edge of a curvature corresponding with and coextensive with the end to end configuration of a selected fruit, and fixed pivotal mountings for said knife at each end thereof substantially in alignment with the axis of such fruit.

61. In a fruit peeling machine, a preshaped rotatable knife having end sections and a central section, the axis of rotation of said knife traversing said end sections, and the central section having a fixed cutting edge of a curvature corresponding generally with the end to end contour of a selected fruit, and means extending away from the ends of said knife and at the outside thereof providing a fixed pivotal mounting therefor, said pivotal mounting being substantially coincident with the axis of such fruit.

62. In a peeling machine, a preshaped strap knife having end sections and a central section, said knife being rotatable about an axis traversing its end sections, said central section having a fixed cutting edge of a predetermined curvature from end to end, the cutting edge being at selected radial distances from the axis of rotation corresponding substantially with the end to end contour of a fruit, and means extending away from the ends of said knife and on the outside thereof providing a pivotal mounting therefor and guiding said knife about a fixed path substantially concentric with the axis of such fruit.

63. In a peeling machine, a longitudinally curved preshaped strap knife having an axis of rotation coinciding substantially with the central axis of a selected fruit, the cutting edge of said knife being fixed and defining a flat plane and the curvature of the knife being similar to the curvature of the periphery of the type of fruit to be peeled, such curvature of the knife being of less radial extent from the axis of rotation than the periphery of a normal fruit of the type selected, and means for mounting said knife for movement about a fixed path.

64. For use with a peeling device adapted to hold one half of a selected fruit, a peeling knife operating under the peel of a selected fruit and having a fixed cutting edge of the general contour and dimensions of the external periphery of the useful portion of the selected fruit, and having its ends fixedly pivoted a distance apart greater than the length of the selected fruit and in substantial alignment with the principal axis of such fruit.

65. In combination, a peeling knife rotatable about an axis coinciding substantially with the longitudinal axis of a selected fruit and in a fixed path about the periphery of such fruit, the cutting edge of the knife being fixed and of a contour corresponding generally to the useful body of the selected fruit and being spaced from the axis of rotation of the knife a distance less than the radius of the fruit to be peeled, and means for moving said knife upon its axis and along its fixed path to sever the peeling from the body of such fruit in a continuous line extending from end to end of the half fruit.

66. A paring device comprising opposed half fruit enclosing members, one of said members having a shape corresponding generally to the shape of the fruit to be peeled, a peeling knife provided with a cutting edge corresponding to the periphery of a half fruit in said enclosing members, and a pivotal mounting for said knife providing a fixed path of travel for said knife adjacent said fruit shaped member transverse of said blade and with the cutting edge of said blade immediately beneath the skin of the fruit enclosed in said enclosing members.

67. In combination, a receptacle shaped to correspond with the periphery of a fruit, means for paring the peel from such fruit entering the receptacle and moving in a path at a fixed distance from the wall of said receptacle, and means for holding the fruit against displacement from said receptacle while said paring means is operative.

68. Fruit treating apparatus operable upon a half fruit, comprising the combination of a flat pad extending over a relatively large area of the severed surface of such fruit, means for holding the fruit against the pad, and a paring knife of strap material extending substantially the length of the fruit and having the shape of the periphery of such fruit rotatable on an axis substantially in the face of said pad and cutting beneath the skin of such fruit to remove such skin.

69. Fruit treating apparatus operable upon a half fruit, comprising a pad having a face extending over a relatively large area of the severed surface of such fruit, means for holding the fruit against the pad, a paring knife having a body possessing from end to end a predetermined fixed cutting edge corresponding generally to the periphery of such fruit, and pivotal mountings for said knife, the axis of said pivotal mountings being in substantial alignment with the face of said pad and permitting of movement of said knife in an arcuate path to cut the skin from a fruit having its severed surface against the face of said pad.

70. Fruit treating apparatus operable upon a half fruit, comprising a pad having a face to receive the severed surface of such fruit, said face extending laterally to points approximating the periphery of such severed surface, means for holding the fruit against the pad, a paring knife having a body possessing from end to end a predetermined curved fixed cutting edge corresponding generally to the periphery of such fruit, said knife in its inoperative position lying at one side of and away from the face of said pad, and pivotal mountings for said knife permitting of movement of said knife in a fixed path through such fruit against said pad and beneath the skin thereof from one side of said pad through the fruit and to the other side of said pad.

71. The combination with a holding mechanism for maintaining a half fruit against displacement and having as a part thereof a pad with a relatively large area for engaging a half fruit upon its flat surface, of a strap knife having a longitudinal configuration corresponding to the periphery of such fruit and pivoted at the ends of said pad in a plane in substantial alignment with the face of said pad, and means for moving said knife into and through such fruit in a curved path in close proximity to the periphery thereof to sever the skin therefrom.

72. That method of paring fruit which comprises the steps of progressively cutting the fruit to form a plane surface thereon, holding the fruit against such plane surface, and removing the peeling from the fruit by cutting along a continuous line extending entirely along one edge of the fruit and rotating the cutting line about the core of the fruit.

73. That method of preparing fruit for canning which comprises the steps of progressively cutting the fruit to form a plane surface thereon, holding the fruit with its plane surface against a flat object, and removing the exterior portion of the fruit not contacting with said flat object by starting cutting along a continuous predetermined line of substantially the shape of the fruit entering one side of the plane face of the fruit and continuing to cut along the said line as the line defines a surface of revolution about the axis of the fruit.

74. That method of paring fruit which comprises the steps of cutting the fruit to provide a plane surface, engaging such plane surface to hold the fruit, and cutting the epidermis from the remainder of the fruit along a continuous line by beginning and terminating the paring operation in the plane face of the fruit while engaging such plane surface.

75. That method of paring a fruit that comprises the steps of cutting the fruit to provide a plane surface, engaging such plane surface to hold the fruit, and removing the epidermis from such held fruit in a single piece by a cutting operation which is wholly within and spaced from the epidermis of the fruit.

76. That method of paring a fruit that comprises the steps of dividing such fruit to provide a fruit section having a plane surface, and engaging the fruit section upon such plane surface while trimming the remaining surface of such fruit section by cutting on a continuous line extending entirely along one edge and continuing the cutting to the other edge of the fruit to effect a predetermined contour therefor.

77. That process of peeling a fruit that comprises the steps of holding the fruit and cutting the peeling from the body of the fruit on a line slightly removed from the periphery of such fruit and extending one hundred and eighty degrees thereabout and maintaining the body and peel in a normal position during the peeling operation.

78. That process of peeling a fruit that comprises the steps of providing a plane surface thereon, holding the fruit by its periphery and such plane surface, and passing a knife through the plane surface of the fruit in proximity to its periphery and wholly under the skin of the fruit.

79. That process of peeling a fruit that comprises the steps of providing a plane surface thereon, holding the fruit by its periphery and such plane surface, and passing therethrough a knife extending from end to end of such fruit in proximity to its periphery.

80. That process of peeling a fruit that comprises the steps of providing a plane surface thereon, resiliently supporting the fruit while engaging such plane surface and its periphery, and passing a knife through the plane surface of the held fruit from one edge to the other and in close proximity to the periphery thereof and wholly under the skin.

81. That process of peeling a fruit that comprises the steps of providing a plane surface thereon, resiliently supporting the fruit while engaging such plane surface and the periphery thereof, and passing a knife extending from end to end of the fruit through such fruit in close proximity to the periphery thereof while so held.

82. That process of peeling a fruit that comprises the steps of splitting the fruit, holding the split sections upon the cut surface and about the periphery thereof, and passing a knife through such sections in close proximity to and under the periphery in a path commencing and terminating in the plane face of the fruit while the fruit is so held.

83. That process of peeling a fruit that comprises the steps of providing a plane surface upon the fruit, engaging the plane surface thereof, resiliently supporting the fruit at its periphery, and passing a knife coextensive with the length of the fruit through such fruit in close proximity to its periphery.

84. That process of peeling a fruit that comprises the steps of cutting a fruit to provide a knife receiving section extending substantially from end to end thereof and passing a knife extending from end to end thereof through the exposed section of the fruit in close proximity to its periphery and concurrently maintaining the fruit and peeling in their normal relation.

85. That process of paring fruit which comprises the forming of a blade receiving radial face on such fruit, and thereafter peeling the fruit with a knife cutting on a continuous line coextensive with such radial face and concentric with the periphery of the fruit and inserted into such fruit at such blade receiving radial face.

86. That process of peeling a half fruit that comprises the steps of maintaining a fruit in position while contacting its flat side and removing the peeling from its curved periphery in a single piece extending from end to end by cutting such fruit along a single advancing line in proximity to such periphery.

87. That process of peeling a half fruit obtained by splitting the whole fruit on the axis of its core that comprises the steps of enclosing such half fruit and thereafter removing its peeling in one piece extending from end to end thereof by cutting such fruit along its periphery in a single advancing line which is moved one hundred and eighty degrees about its axis.

88. That process of peeling a half fruit that comprises the steps of enclosing such half fruit, holding the half fruit by its flat side, and removing the peeling in a single piece extending from end to end thereof by cutting such fruit along a single advancing line.

89. That process of peeling a half fruit that comprises the steps of resiliently holding such fruit at its periphery and flat face, and removing the peeling from the peripheral side thereof in a single piece one hundred and eighty degrees about its axis and extending from end to end thereof without diverting such peeling from the fruit.

90. That process of peeling a half fruit that comprises the steps of resiliently holding such half fruit about its periphery and upon its flat side, and removing the peeling at its periphery in a single piece extending from end to end thereof without disturbing the normal relation between the peeling and fruit.

91. That process of peeling a fruit that comprises the steps of cutting a substantially radial surface in the fruit, resiliently holding the cut fruit about its periphery and by its radial surface, and removing the peeling in a single piece defined at one edge by such radial surface.

92. That process of peeling a fruit that comprises the steps of cutting a substantially radial surface in such fruit, resiliently holding such fruit about its periphery and by the central portion of such radial surface with a portion of such radial surface exposed, and removing the peeling in a single piece one edge of which is defined by such radial surface.

93. That process of peeling a fruit that comprises the steps of cutting a knife receiving face thereon, and passing a knife extending from end to end of the fruit through such fruit in a path beginning with such face and running in proximity to the periphery of such fruit, and concurrently maintaining such fruit and peeling in their normal relation.

94. That process of peeling a fruit that comprises the steps of removing a section from the fruit extending substantially from end to end thereof and providing a radial surface, and passing a knife on a continuous line coextensive with and beginning with such radial surface of the fruit and in a path in close proximity to its periphery.

MARK EWALD.